United States Patent [19]
Kim

[11] Patent Number: 6,049,631
[45] Date of Patent: Apr. 11, 2000

[54] APPARATUS AND METHOD FOR ADAPTIVE CODING A BINARY SHAPE SIGNAL

[75] Inventor: Jin-Hun Kim, Seoul, Rep. of Korea

[73] Assignee: Daewoo Electronics Co., Ltd., Rep. of Korea

[21] Appl. No.: 08/985,621

[22] Filed: Dec. 5, 1997

[30] Foreign Application Priority Data

Oct. 31, 1997 [KR] Rep. of Korea ........................ 97-57473

[51] Int. Cl.[7] .................................................. G06K 9/36
[52] U.S. Cl. ........................................... 382/239; 382/236
[58] Field of Search ................................... 382/239, 236; 348/415, 416

[56] References Cited

U.S. PATENT DOCUMENTS

| | | | |
|---|---|---|---|
| 5,398,078 | 3/1995 | Masuda et al. | 348/699 |
| 5,666,461 | 9/1997 | Igarashi et al. | 386/95 |
| 5,909,511 | 6/1999 | Yoshimoto | 382/236 |
| 5,929,915 | 7/1999 | Cho | 382/238 |
| 5,933,105 | 8/1999 | Cho | 348/416 |

*Primary Examiner*—Yon J. Couso
*Attorney, Agent, or Firm*—Anderson Kill & Olick

[57] ABSTRACT

In an apparatus and method for encoding a binary alpha block (BAB) of binary pixels within a current frame based on the current frame and a previous frame including a plurality of BAB's, the BAB is adaptively encoded, wherein each frame has a top field and a bottom field and each BAB has a top BAB-field and a bottom BAB-field. If all of the binary pixels within a BAB within the current frame are defined either as background pixels or as object pixels, the BAB is encoded on a BAB-by-BAB basis and if otherwise, checks the binary pixels of the top BAB-field and the bottom BAB-field of the BAB. Namely, if all of the binary pixels within at least one of the top BAB-field and the bottom BAB-field are defined either as background pixels or as object pixels, it is decided to encode the BAB on a BAB-field by BAB-field basis, if otherwise, ME is performed on the top BAB-field and the bottom BAB-field based on the top field and the bottom field of the previous frame. An then, based on the result of the ME, it is decided to encode the BAB either on a BAB-by-BAB basis or on a BAB-field by BAB-field basis according to a predetermined decision rule to enhance the coding efficiency thereof.

20 Claims, 5 Drawing Sheets

APPARATUS AND METHOD FOR ADAPTIVE CODING A BINARY SHAPE SIGNAL

FIELD OF THE INVENTION

The present invention relates to an apparatus and method for coding a binary shape signal; and, more particularly, to an apparatus and method for adaptive coding a binary shape signal.

DESCRIPTION OF THE PRIOR ART

In digital video systems such as video-telephone and teleconference systems, a large amount of digital data is needed to define each video frame signal since the video frame signal comprises a sequence of digital data referred to as pixel values.

Since, however, the available frequency bandwidth of a conventional transmission channel is limited, in order to transmit the substantial amount of digital data therethrough, it is necessary to compress or reduce the volume of the data through the use of various data compression techniques, especially, in the case of such low bit-rate video signal encoders as video-telephone and teleconference systems.

One of such techniques for encoding video signals for a low bit-rate encoding system is an object-oriented analysis-synthesis coding technique, wherein an input video image is divided into objects; and three sets of parameters for defining the motion, contour and pixel data of each object are processed through different encoding channels.

One example of such object-oriented coding scheme is the so-called MPEG (Moving Picture Experts Group) phase 4 (MPEG-4), which is designed to provide an audio-visual coding standard for allowing content-based interactivity, improved coding efficiency and/or universal accessibility in such applications as low-bit rate communication, interactive multimedia (e.g., games, interactive TV, etc.) and area surveillance.

According to MPEG-4, an input video image is divided into a plurality of video object planes (VOP's), which correspond to entities in a bitstream that a user can access and manipulate. A VOP can be referred to as an object and represented by a bounding rectangle whose width and height may be a smallest multiples of 16 pixels (a macroblock size) surrounding each object so that the encoder may process the input video image on a VOP-by-VOP basis.

A VOP described in MPEG-4 includes shape information and color information consisting of luminance and chrominance data, wherein the shape information is represented by, e.g., a binary mask and related to the luminance data. In the binary mask, a designated binary value, e.g., 0, is used to represent a pixel, i.e., a background pixel, located outside the object in the VOP and another binary value, e.g., 255, is used to indicate a pixel, i.e., an object pixel inside the object. A binary shape signal, representing the location and shape of the objects, can be expressed by a binary alpha block (BAB) within a frame or a VOP, e.g., a block of 16×16 binary pixels, wherein each binary pixel has a binary value, e.g., 0 representing a background pixel or 255 representing an object pixel.

A BAB can be encoded by using a conventional bit-map-based shape coding method such as a context-based arithmetic encoding (CAE) method. In detail, in an intra mode, a BAB in a current frame (or VOP) is encoded by using an intra CAE method to thereby generate an encoded BAB, wherein in the intra CAE method, a context value of a binary pixel in the BAB within the current frame is obtained by using context values of binary pixels surrounding the binary pixel of the BAB in the current frame (or VOP).

And in an inter mode, a BAB in a current frame (or VOP) is encoded by using a predetermined one of an intra CAE method and an inter CAE method to thereby generate an encoded BAB, wherein in the inter CAE method, a context value of a binary pixel of the BAB in the current frame is obtained by using context values of binary pixels surrounding the binary pixel in the current frame (or VOP) and context values of binary pixels within a previous frame (or VOP) (see *MPEG-4 Video Verification Model Version 7.0*, International Organization for Standardization, Coding of Moving and Associated Audio Information, ISO/IEC JTC1/SC29/WG11 MPEG97/N1642, Bristol, April 1997, pp 28–30). Meanwhile, in the conventional binary shape encoding method, instead of encoding all of the binary pixel values to generate encoded binary pixel values to be transmitted, a mode signal representing or characterizing a corresponding encoding condition for the BAB is encoded to improve the coding efficiency, thereby generating and then transmitting a corresponding encoded mode signal.

In this respect, according to a conventional mode coding method, in encoding a BAB, one mode signal representing one of 7 number of modes as listed in the following [TABLE. 1] is given to the BAB and then encoded as a corresponding encoded mode signal to be transmitted.

Referring to [TABLE.1], there are 7 number of mode signals. Namely, there are a first mode signal representing that a motion vector difference for shape (MVDs) of the BAB is defined as zero and the binary pixel values within the BAB have not been coded, wherein the MVDs is a difference between a motion vector (MV) of the BAB and a motion vector predictor for shape (MVPs) for the BAB; a second mode signal representing that the MVDs is not defined as zero and the binary pixel values within the BAB have not been coded; a third mode signal representing that all of the binary pixels within the BAB are defined as background pixels; a fourth mode signal representing that all of the binary pixels within the BAB are defined as object pixels; a fifth mode signal representing that the binary pixel values within the BAB have been intra CAE coded; a sixth mode signal representing that the MVDs is defined as zero and the binary pixel values within the BAB have been inter CAE coded; and a seventh mode signal representing that the MVDs is not defined as zero and the binary pixel values within the BAB have been inter CAE coded (see *MPEG-4 Video Verification Model Version 7.0*, International Organization for Standardization, Coding of Moving And Associated Audio Information, ISO/IEC JTC1/SC29/WG11 MPEG97/ N1642, Bristol, April 1997, pp 20–22).

TABLE 1

| MODE | CODING CONDITION |
| --- | --- |
| 1 | MVDs==0 && NO_UPDATE |
| 2 | MVDs!=0 && NO_UPDATE |
| 3 | ALL_0 |
| 4 | ALL_255 |
| 5 | INTRA CAE |
| 6 | MVDs==0 && INTER CAE |
| 7 | MVDs!=0 && INTER CAE |

Conventional binary shape signal encoding methods employing the conventional mode coding method described above are basically progressive coding methods. Namely, in the conventional binary shape encoding methods, an interlaced coding technique performed by using field-by-field basis motion estimation method has not been used. Hence, even if spatial and/or temporal correlation between frames is lower than that between fields, the interlaced coding technique has not been employed, thereby limiting the enhancing capability of the coding efficiency thereof.

SUMMARY OF THE INVENTION

It is, therefore, a primary object of the present invention to provide an apparatus and method for adaptive coding a binary shape signal by performing progressive coding and interlaced coding on the binary shape signal adaptively.

In accordance with the present invention, there is provided an apparatus for adaptive coding a binary alpha block (BAB) of M×N binary pixels within a current frame based on the current frame and a previous frame, M and N being positive integers, respectively, wherein each of the current and the previous frames includes a plurality of BAB's, each frame has a top field and a bottom field, each BAB has a top BAB-field and a bottom BAB-field and each binary pixel has a binary value representing either an object pixel or a background pixel, comprising: first decision circuit for deciding to encode a BAB within the current frame on a BAB-by-BAB basis under a first condition that all of the binary pixels within the BAB are defined either as background pixels or as object pixels and deciding to encode the BAB on a BAB-field by BAB-field basis under a second condition that all of the binary pixels within one of the top BAB-field and the bottom BAB-field are defined either as background pixels or as object pixels when the first condition is not satisfied and providing the top BAB-field and the bottom BAB-field under a third condition that neither the first nor the second conditions is satisfied; a top BAB-field motion (ME) circuit for transmitting the top BAB-field and then if a top BAB-field identical to the top BAB-field of the BAB is detected among top BAB-field's in a previous top field as a first predicted top BAB-field, providing a first top BAB-field motion vector (MV) representing a displacement between the first predicted top BAB-field and the top BAB-field; and a first bottom BAB-field ME circuit for transmitting the bottom BAB-field and then if a bottom BAB-field identical to the bottom BAB-field of the BAB is detected among bottom BAB-field's in a previous bottom field as a first predicted bottom BAB-field, providing a first bottom BAB-field MV representing a displacement between the first predicted bottom BAB-field and the bottom BAB-field.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

In accordance with the present invention, there is provided an apparatus and method for adaptive coding a binary shape signal.

Figure 1:
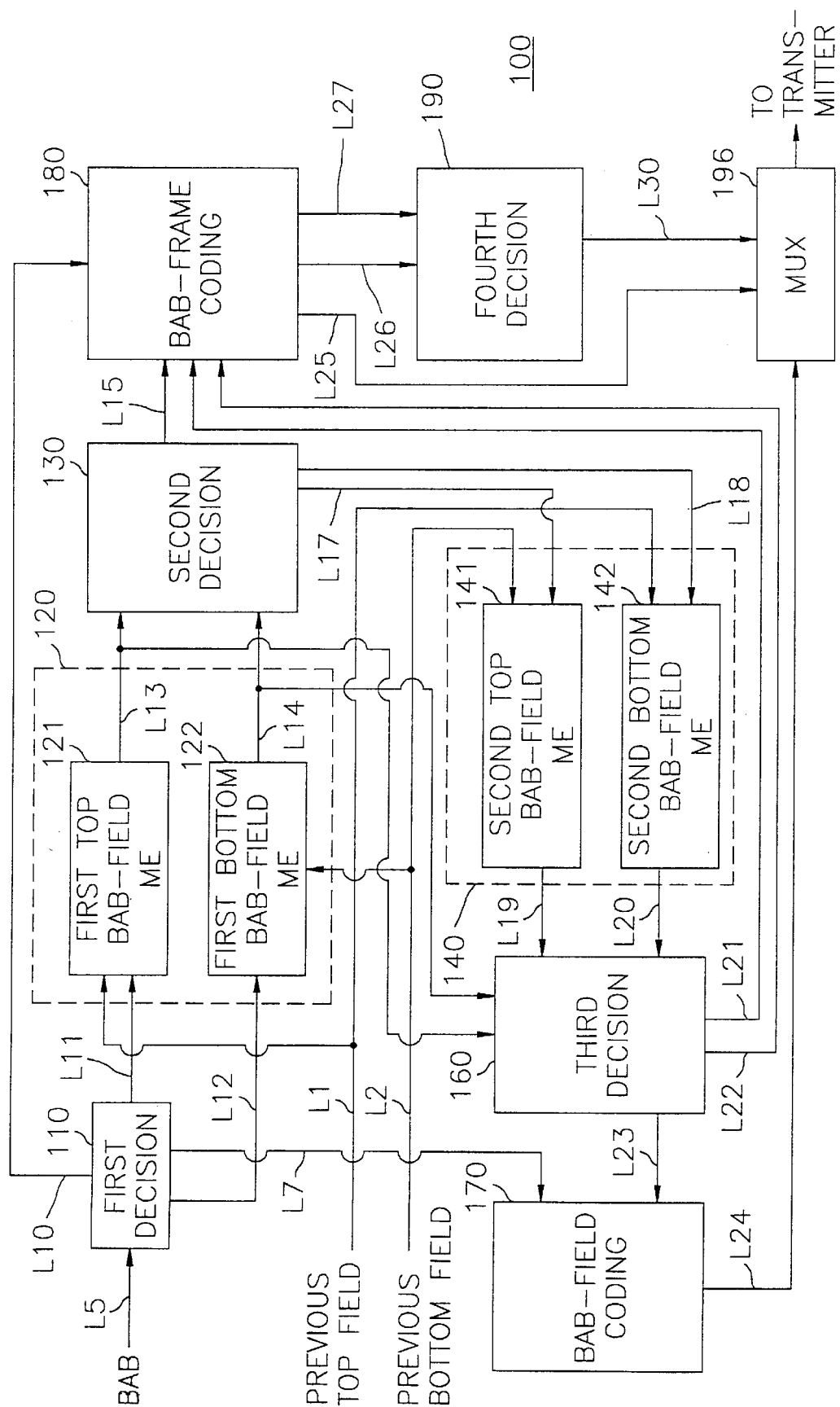
FIG. 1 illustrates an apparatus for adaptive coding a binary shape signal in accordance with the preferred embodiment of the present invention.
Figure 3:
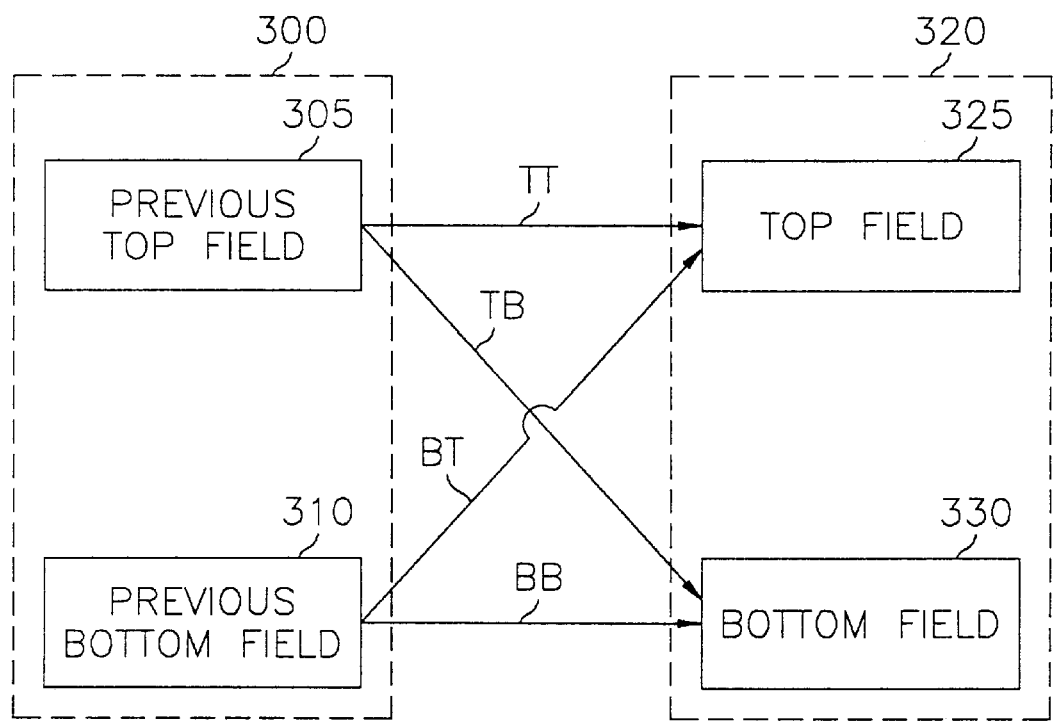
FIG. 3 represents a current frame including the top field and the bottom field and a previous frame including the previous top field and the previous bottom field for use in explaining the apparatus for adaptive coding a binary shape signal in accordance with the present invention.

Referring to FIG. 1, there is illustrated an apparatus for adaptive coding a binary shape signal in accordance with a preferred embodiment of the present invention. A current frame 320 including a top field 325 and a bottom field 330 and a previous frame 300 including a previous top field 305 and a previous bottom field 310 are shown in FIG. 3 for use in explaining an apparatus for adaptive coding a binary shape signal in accordance with the present invention.

In accordance with the preferred embodiment of the present invention, there is provided an apparatus 100 for adaptive coding a binary alpha block (BAB) of M×N binary pixels within a current frame based on the current frame and a previous frame including a plurality of BAB's, M and N being positive integers, typically 16's, respectively, wherein each frame has a top field and a bottom field, each BAB has a top BAB-field and a bottom BAB-field and each binary pixel has a binary value representing either an object pixel or a background pixel. It should be noticed here that the top field represents an even field including only even lines of the frame and the bottom field represents an odd field including only odd lines of the frame or vice versa, wherein each line of the frame has a sequence of pixel values.

Figure 2:
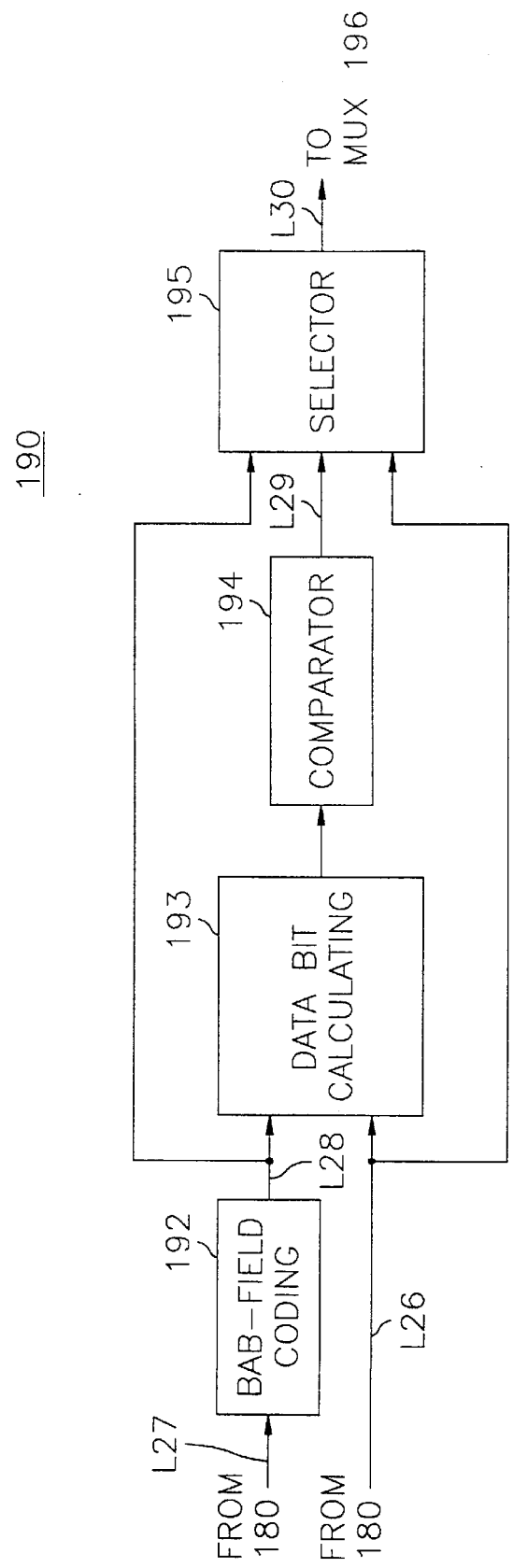
FIG. 2 shows a detailed block diagram of a fourth decision circuit shown in FIG. 1.

The apparatus 100 comprises a first decision circuit 110, a first BAB-field motion estimation (ME) circuit 120, a second decision circuit 130, a second BAB-field ME circuit 140, a third decision circuit 160, a BAB-field coding circuit 170, a BAB-frame coding circuit 180, a fourth decision circuit 190 and a multiplxer (MUX) 196. The first BAB-field ME circuit 120 includes a first top BAB-field ME circuit 121 and a first bottom BAB-field ME circuit 122. The second BAB-field ME circuit 140 includes a second top BAB-field ME circuit 141 and a second bottom BAB-field ME circuit 142. And the fourth decision circuit 190 includes a BAB-field coding circuit 192, a data bit calculating circuit 193, a comparator 194 and a selector 195 as shown in FIG. 2.

It should be noticed here that the current frame and the previous frame may be replaced by a current video object plane (VOP) and a previous VOP, respectively. For simplicity, referring to FIGS. 1 to 3, the apparatus 100 for adaptive coding a BAB within a current frame will be described herein only based on the current frame and a previous frame.

First, in an inter mode, a BAB within the current frame, e.g., 320, is inputted to the first decision circuit 110 via a line L5. And at the same time, a previous top field, e.g., 305, of the previous frame, e.g., 300, is coupled to the first top BAB-field ME circuit 121 and the second bottom BAB-field ME circuit 142 through a line L1 and a previous bottom field, e.g., 310, of the previous frame, e.g., 300, is coupled to the first bottom BAB-field ME circuit 122 and the second top BAB-field ME circuit 141 through a line L2.

The first decision circuit 110 decides to encode a BAB within the current frame on a BAB-frame by BAB-frame basis, i.e., on a BAB-by-BAB basis under a first condition that all of the binary pixels within the BAB are defined either as background pixels or as object pixels and decides to encode the BAB on a BAB-field by BAB-field basis under a second condition that all of the binary pixels within one of the top BAB-field and the bottom BAB-field are defined either as background pixels or as object pixels when the first condition is not satisfied. And the first decision circuit 110 provides the top BAB-field and the bottom BAB-field under a third condition that neither the first nor the second conditions is satisfied.

In detail, the first decision circuit 110, if all of the binary pixels within the BAB are defined either as background pixels (in this case, the BAB is characterized as ALL_0) or as object pixels (in this case, the BAB is characterized as ALL_255), decides to encode the BAB on a BAB-by-BAB basis to thereby generate either a mode signal FR-3 if the BAB is characterized as ALL_0 or a mode signal FR-4 if the BAB is characterized as ALL_255. And then, the first decision circuit 110 provides either the mode signal FR-3 or FR-4 to the BAB-frame coding circuit 180 via a line L10.

From now on, for simplicity, it is assumed that if all of the binary pixels within a BAB-field, i.e., either a top BAB-field or a bottom BAB-field are defined as background pixels, the BAB-field is characterized as ALL_0 and if all of binary pixels within a BAB-field are defined as object pixels the BAB-field is characterized as ALL_255. And it should be noticed here that a conventional method which is well known in the art is used to determine whether all of the binary pixels within a BAB (or a BAB-field) can be defined as either background pixels or object pixels.

If the BAB is characterized neither as ALL_0 nor ALL_255, the first decision circuit 110 divides the BAB into a top BAB-field and a bottom BAB-field of the BAB. And then the first decision circuit 110, if the top BAB-field is characterized either as ALL_0 or as ALL_255, decides to encode the BAB on a BAB-field by BAB-field basis to thereby generate either a mode signal T-3 if the top BAB-field is characterized as ALL_0 or a mode signal T-4 if the top BAB-field is characterized as ALL_255. And then, the first decision circuit 110 provides either the mode signal T-3 or T-4 to the BAB-field coding circuit 170 via a line L7.

And at the same time, the first decision circuit 110, if the bottom BAB-field is characterized either as ALL_0 or as ALL_255, decides to encode the BAB on a BAB-field by BAB-field basis to thereby generate either a mode signal B-3 if the bottom BAB-field is characterized as ALL_0 or a mode signal B-4 if the bottom BAB-field is characterized as ALL_255. And then, the first decision circuit 110 provides either the mode signal B-3 or B-4 to the BAB-field coding circuit 170 via the line L7.

Meanwhile, the first decision circuit 110, if none of the mode signals FR-3, FR-4, T3, T-4, B-3 and B-4 is generated therein, provides the top BAB-field and the bottom BAB-field to the first top BAB-field ME circuit 121 and the first top BAB-field ME circuit 122 via a line L11 and a line L12, respectively.

The first top BAB-field ME circuit 121 transmits the top BAB-field to the second decision circuit 130 and the third decision circuit 160 via a line L13 and then performs a first top BAB-field ME on a top BAB-field within the top field, e.g., 325, based on a previous top field, e.g., 305, through a path TT as shown in FIG. 3. And the first bottom BAB-field ME circuit 122 transmits the bottom BAB-field to the second decision circuit 130 and the third decision circuit 160 via a line L14 and then performs a first bottom BAB-field ME for a bottom BAB-field within the bottom field, e.g., 330, based on a previous bottom field, e.g., 310, through a path BB as shown in FIG. 3.

In detail, if a top BAB-field identical to the top BAB-field inputted thereto via the line L11 is detected among the top BAB-fieldIs in a previous top field (in this case, the top BAB-field is characterized as NO_UPDATE) as a first predicted top BAB-field, the first top BAB-field ME circuit 121 provides a first top BAB-field motion vector (MV) representing the displacement between the first predicted top BAB-field and the top BAB-field to the second decision circuit 130 and the third decision circuit 160 through the line L13.

And, if a bottom BAB-field identical to the bottom BAB-field inputted thereto via the line L12 is detected among the bottom BAB-field's in a previous bottom field (in this case, the bottom BAB-field is characterized as NO_UPDATE) as a first predicted bottom BAB-field, the first bottom BAB-field ME circuit 122 provides a first bottom BAB-field MV representing the displacement between the first predicted bottom BAB-field and the bottom BAB-field to the second decision circuit 130 and the third decision circuit 170 through the line L14.

The second decision circuit 130 decides to encode the top BAB-field and the bottom BAB-field on a BAB-by-BAB basis if there exists a first predicted top BAB-field MV which is identical to a first bottom BAB-field MV (in this case, each of the top BAB-field and the bottom BAB-field is characterized as MV_IDENTICAL).

In detail, in the case that the top BAB-field is characterized as NO_UPDATE and as MV_IDENTICAL, the second decision circuit 130 provides the first predicted top BAB-field MV which is identical to the first bottom BAB-field MV as a first MV. And at the same time the second decision circuit 130 generates a mode signal FR-N1 informing that the first MV exists. And then the second decision circuit 130 provides the first MV and the mode signal FR-N1 to the BAB-frame coding circuit 180 via a line L15.

But, if there does not exist a first MV, the second decision circuit 130 provides the top BAB-field and the bottom BAB-field of the BAB within the current frame to the second top BAB-field ME circuit 141 and the second bottom BAB-field ME circuit 142 in the second BAB-field ME circuit 140 via a line L17 and a line L18, respectively.

The second top BAB-field ME circuit 141 performs ME on the top BAB-field within the top field, e.g., 325, based on the previous bottom field, e.g., 310, through a path BT as shown in FIG. 3. And the second bottom BAB-field ME circuit 142 performs ME on the bottom BAB-field within the bottom field, e.g., 330, based on the previous top field, e.g., 305, through a path TB as shown in FIG. 3.

In detail, if a bottom BAB-field identical to the top BAB-field inputted thereto through the line L17 is detected among the bottom BAB-field's in the previous bottom field (in this case, the top BAB-field is characterized as NO_UPDATE) as a second predicted top BAB-field, the second top BAB-field ME circuit 141 provides a second top BAB-field MV representing the displacement between the second predicted top BAB-field and the top BAB-field to the third decision circuit 160 via a line L19.

And if a top BAB-field identical to the bottom BAB-field inputted thereto through the line L18 is detected among the top BAB-field's in the previous top field (in this case, the bottom BAB-field is characterized as NO_UPDATE) as a second predicted bottom BAB-field, the second bottom BAB-field ME circuit 142 provides a second bottom BAB-field MV representing the displacement between the second predicted bottom BAB-field and the bottom BAB-field to the third decision circuit 160 through a line L20.

The third decision circuit 160 decides to encode the top BAB-field and the bottom BAB-field on a BAB-BAB basis if there exists a second top BAB-field MV which is identical to a second bottom BAB-field MV (in this case, each of the top BAB-field and the bottom BAB-field is characterized as MV_IDENTICAL).

In detail, in the case that the top BAB-field is characterized as NO_UPDATE and as MV_IDENTICAL, the third decision circuit 160 provides the second top BAB-field MV which is identical to the second bottom BAB-field MV as a second MV and generates a mode signal FR-N2 informing that the second MV exists. And then the third decision circuit 160 provides the second MV and the mode signal FR-N2 to the BAB-frame coding circuit 180 via a line L21.

But, if there does not exist a second MV, the third decision circuit 160 checks whether there exist a first and a second top BAB-field MV's and a first and a second bottom BAB-field MV's inputted thereto. And then, the third decision circuit 160 decides to encode the top BAB-field and the bottom BAB-field on a BAB-by-BAB basis by using a conventional BAB-frame coding method or BAB coding method performed by employing frame-by-frame basis ME technique if there exists neither a first predicted top BAB-field MV nor a second top BAB-field MV inputted thereto (in this case, the top BAB-field is characterized as UPDATE) and at the same time there exists neither a first bottom BAB-field MV nor a second bottom BAB-field MV inputted thereto (in this case, the bottom BAB-field is characterized as UPDATE). In this case, the third decision circuit 160 combines the top BAB-field with the bottom BAB-field to thereby provide the BAB to the BAB-frame coding circuit 180 via a line L22.

And if there exists at least one of the first and the second top BAB-field MV's and the first and the second bottom BAB-field MV's when there is no second MV inputted thereto, the third decision circuit 160 decides to encode the top BAB-field and the bottom BAB-field on a BAB-field by BAB-field basis by using a BAB-field coding method performed by using field-by-field basis ME technique to thereby provide the top BAB-field and the bottom BAB-field of the BAB within the current frame to the BAB-field coding circuit 170 via a line L23.

Further, if either the first and the second top BAB-field MV's are inputted thereto or only the first top BAB-field MV thereof is inputted thereto, the third decision circuit 160 provides the first top BAB-field MV to the BAB-field coding circuit 170 and generates a control signal CT1 to be transmitted to the BAB-field coding circuit 170. And if only the second top BAB-field MV of the first and the second top BAB-field MV's is inputted thereto, the third decision circuit 160 provides the second top BAB-field MV to the BAB-field coding circuit 170 and generates a control signal CT2 to be transmitted to the BAB-field coding circuit 170.

And, if either the first and the second bottom BAB-field MV's are inputted thereto or only the first bottom BAB-field MV thereof is inputted thereto, the third decision circuit 160 provides the first bottom BAB-field MV to the BAB-field coding circuit 170 and generates a control signal CB1 to be transmitted to the BAB-field coding circuit 170. And if only the second bottom BAB-field MV of the first and the second bottom BAB-field MV's is inputted thereto, the third decision circuit 160 provides the second bottom BAB-field MV to the BAB-field coding circuit 170 and generates a control signal CB2 to be transmitted to the BAB-field coding circuit 170.

The BAB-field coding circuit 170 encodes the mode signals T-3 and T-4 if the mode signals T-3 and T-4 are inputted thereto to thereby provide encoded mode signals [T-3] and [T-4] as encoded top BAB-field's to the MUX 196 via a line L24, respectively, and encodes the mode signals B-3 and B-4 if the mode signals B-3 and B-4 are inputted thereto to thereby provide encoded mode signals [B-3] and [B-4] as encoded bottom BAB-field's to the MUX 196 via the line L24, respectively.

And the BAB-field coding circuit 170, in response to the control signal CT1, checks by using a conventional checking method based on a predetermined motion vector predictor for shape (MVPs) for the top BAB-field and the first top BAB-field MV inputted thereto whether the motion vector difference for shape (MVDs) for the top BAB-field is 0 or not and then generates a mode signal TT-1 if the MVDs is 0 and a mode signal TT-2 if the MVDs is not 0.

And then the BAB-field coding circuit 170 encodes the mode signal TT-1 to thereby provide an encoded mode signal [TT-1] as an encoded top BAB-field to the MUX 196 via the line L24 and encodes the MVDs for the top BAB-field and the mode signal TT-2 to generate an encoded MVDs for the top BAB-field and an encoded mode signal [TT-2], respectively, and then combines the encoded MVDs with the encoded mode signal [TT-2] to thereby provide an encoded top BAB-field to the MUX 196 via the line L24.

And the BAB-field coding circuit 170, in response to the control signal CT2, checks by using the conventional checking method based on the predetermined MVPs for the top BAB-field and the second top BAB-field MV inputted thereto whether the MVDs for the top BAB-field is 0 or not and then generates a mode signal BT-1 if the MVDs is 0 and a mode signal BT-2 if the MVDs is not 0.

And then the BAB-field coding circuit 170 encodes the mode signal BT-1 to thereby provide an encoded mode signal [BT-1] as an encoded top BAB-field to the MUX 196 via the line L24 and encodes the MVDs for the top BAB-field and the mode signal BT-2 to generate an encoded MVDs for the top BAB-field and an encoded mode signal [BT-2], respectively, and then combines the encoded MVDs with the encoded mode signal [BT-2] to thereby provide an encoded top BAB-field to the MUX 196 via the line L24.

And the BAB-field coding circuit 170, in response to the control signal CB1, checks by using the conventional checking method based on a predetermined MVPs for the bottom BAB-field and the first bottom BAB-field MV inputted thereto whether the MVDs for the bottom BAB-field is 0 or not and then generates a mode signal BB-1 if the MVDs is 0 and a mode signal BB-2 if the MVDs is not 0.

And then the BAB-field coding circuit 170 encodes the mode signal BB-1 to thereby provide an encoded mode signal [BB-1] as an encoded bottom BAB-field to the MUX 196 via the line L24 and encodes the MVDs for the bottom BAB-field and the mode signal BB-2 to generate an encoded MVDs for the bottom BAB-field and an encoded mode signal [BB-2], respectively, and then combines the encoded MVDs with the encoded mode signal [BB-2] to thereby provide an encoded bottom BAB-field to the MUX 196 via the line L24.

And the BAB-field coding circuit 170, in response to the control signal CB2, checks by using the conventional checking method based on the predetermined MVPs for the bottom BAB-field and the second bottom BAB-field MV inputted thereto whether the MVDs for the bottom BAB-field is 0 or not and then generates a mode signal TB-1 if the MVDs is 0 and a mode signal TB-2 if the MVDs is not 0.

And then the BAB-field coding circuit 170 encodes the mode signal TB-1 to thereby provide an encoded mode signal [TB-1] as an encoded bottom BAB-field to the MUX 196 via the line L24 and encodes the MVDs for the bottom BAB-field and the mode signal TB-2 to generate an encoded MVDs for the bottom BAB-field and an encoded mode signal [TB-2], respectively, and then combines the encoded MVDs with the encoded mode signal [TB-2] to thereby provide an encoded bottom BAB-field to the MUX 196 via the line L24.

And the BAB-field coding circuit 170, if none of the mode signal T3, the mode signal, the control signal CT1 and the control signal CT2 is generated, encodes the top BAB-field by using a predetermined one of an intra context based arithmetic encoding (CAE) method and an inter CAE method to thereby generate encoded top BAB-field binary pixel data and at the same time generates a mode signal to the top BAB-field and then encodes the mode signal as an encoded mode signal. And then, the BAB-field coding circuit 170 combines the encoded top BAB-field binary pixel data with the encoded mode signal corresponding thereto to thereby produce an encoded top BAB-field to be transmitted to the MUX 196 through the line L24.

And the BAB-field coding circuit 170, if none of the mode signal B3, the mode signal B-4, the control CB1 and the control signal CB2 is generated, encodes the bottom BAB-field by using the predetermined one of the intra CAE method and the inter CAE method to thereby generate encoded bottom BAB-field binary pixel data and at the same time generates a mode signal to the bottom BAB-field and then encodes the mode signal as an encoded mode signal. And then, the BAB-field coding circuit 170 combines the encoded bottom BAB-field binary pixel data with the encoded mode signal corresponding thereto to thereby produce an encoded bottom BAB-field to be transmitted to the MUX 196 through the line L24.

Meanwhile, the BAB-frame coding circuit 180, if the mode signals FR-3 and FR-4 are inputted thereto through the line L10, encodes the mode signals FR-3 and FR-4 to thereby provide encoded mode signals [FR-3] and [FR-4] as encoded BAB's, respectively, to the MUX 196 via a line L25.

And the BAB-frame coding circuit 180, if the mode signal FR-N1 is inputted thereto via the line L15, checks by using the conventional checking method based on a predetermined MVPs corresponding thereto and the first MV inputted thereto whether the MVDs corresponding thereto is 0 or not and then generates a mode signal FR-1 if the MVDs is 0 and a mode signal FR-2 if the MVDs is not 0.

And the BAB-frame coding circuit 180 encodes the mode signal FR-1 to thereby provide an encoded mode signal [FR-1] as an encoded BAB to the MUX 196 via the line L25. And the BAB-frame coding circuit 180 encodes the MVDs corresponding thereto and the mode signal FR-2 to generate an encoded MVDs and an encoded mode signal [FR-2], respectively, and then combines the encoded MVDs with the encoded mode signal [FR-2] to thereby provide an encoded BAB to the MUX 196 via the line L25.

And the BAB-frame coding circuit 180, if the mode signal FR-N2 is inputted thereto via the line L21, checks by using the conventional checking method based on a predetermined MVPs corresponding thereto and the second MV inputted thereto whether the MVDs corresponding thereto is 0 or not and then generates a mode signal FR-1' if the MVDs is 0 and a mode signal FR-2' if the MVDs is not 0.

And the BAB-frame coding circuit 180 encodes the mode signal FR-1' to thereby provide an encoded mode signal [FR-1'] as an encoded BAB to the MUX 196 via the line L25. And the BAB-frame coding circuit 180 encodes the MVDs corresponding thereto and the mode signal FR-2' to generate an encoded MVDs and an encoded mode signal [FR-2'], respectively, and then combines the encoded MVDs with the encoded mode signal [FR-2'] to thereby provide an encoded BAB to the MUX 196 via the line L25.

It should be noticed here that at the BAB-frame coding circuit 180, in case that the BAB is inputted thereto via either the line L15 or the line L22, the predetermined MVPs for the top BAB-field of the BAB and the predetermined MVPs for the bottom BAB-field of the BAB should be identically set according to a predetermined rule.

And if none of the mode signals FR-3, FR-4, FR-1, FR-2, FR-1' and FR-2' is generated, the BAB-frame coding circuit 180 encodes the binary pixel data of the BAB inputted thereto via the line L22 by using either the inter CAE method or the intra CAE method (in this case the BAB is characterized as either INTRA CAE or as INTER CAE) to generate encoded binary pixel data of the BAB and at the same time generates a mode signal corresponding thereto and then encodes the mode signal to generate an encoded mode signal.

And then the BAB-frame coding circuit 180 combines the encoded binary pixel data of the BAB with the mode signal corresponding to the BAB to thereby provide an encoded BAB to the fourth decision circuit 190 via a line L26. And at the same time, the BAB-frame coding circuit 180 divides the BAB into a top BAB-field and a bottom BAB-field and then provides the top BAB-field and the bottom BAB-field to the fourth decision circuit 190 via a line L27.

Referring to FIG. 2, there is shown a detailed block diagram of the fourth decision circuit 190 shown in FIG. 1. The BAB-field coding circuit 192 in the fourth decision circuit 190 encodes the top BAB-field and the bottom BAB field by using the BAB-field coding method in a same manner as that performed at the BAB-field coding circuit 170 to thereby produce an encoded top BAB-field and an encoded bottom BAB-field and then generate a formatted encoded BAB obtained by combining the encoded top BAB-field with the encoded bottom BAB-field. Then the BAB-field coding circuit 192 provides the formatted encoded BAB to the data bit calculating circuit 193 and the selector 195 via a line L28.

Meanwhile, the encoded BAB is transmitted to the data bit calculating circuit 193 and the selector 195 via the line L26. The data bit calculating circuit 193 calculates first data bit and second data bit for the encoded BAB and the formatted encoded BAB to thereby provide a first number of data bit and a second number of data bit, respectively, to the comparator 194.

The comparator 194 compares the first number of data bit with the second number of data bit and then provides a first selection signal to the selector 195 through a line L29 if the first number of data bit is less than the second number of data bit and if otherwise, i.e., if the first number of data bit is not less than the second number of data bit, provides a second selection signal to the selector 195 through the line L29.

The selector 195 selects the encoded BAB and the encoded formatted BAB as selected encoded BAB's in response to the first selection signal and the second selection signal, respectively, to thereby transmit the selected encoded BAB to the MUX 196 via a line L30.

The MUX 196 multiplexes the encoded BAB, the encoded top BAB-field, the encoded bottom BAB-field and the selected encoded BAB inputted thereto to thereby provide multiplexed data to a transmitter (not shown) for the transmission thereof.

In the above, the apparatus 100 for adaptive coding a binary shape signal in accordance with the present invention is described for the case of the inter mode. In case of an intra mode, only the first decision circuit 110, the BAB-frame coding circuit 180, a fourth decision circuit 190 and the MUX 196 in the apparatus 100 perform their functions described above except for the followings described below.

Namely, the first decision circuit 110 provides a BAB inputted thereto via the line L5 to the BAB-frame coding circuit 180 through the line L10 if neither a mode signal FR-3 nor a mode signal FR-4 is generated therein and then the BAB-frame coding circuit 180 encodes the BAB by using the intra CAE method to thereby provide an encoded BAB to the MUX 196 via the line L25.

Figure 4A:
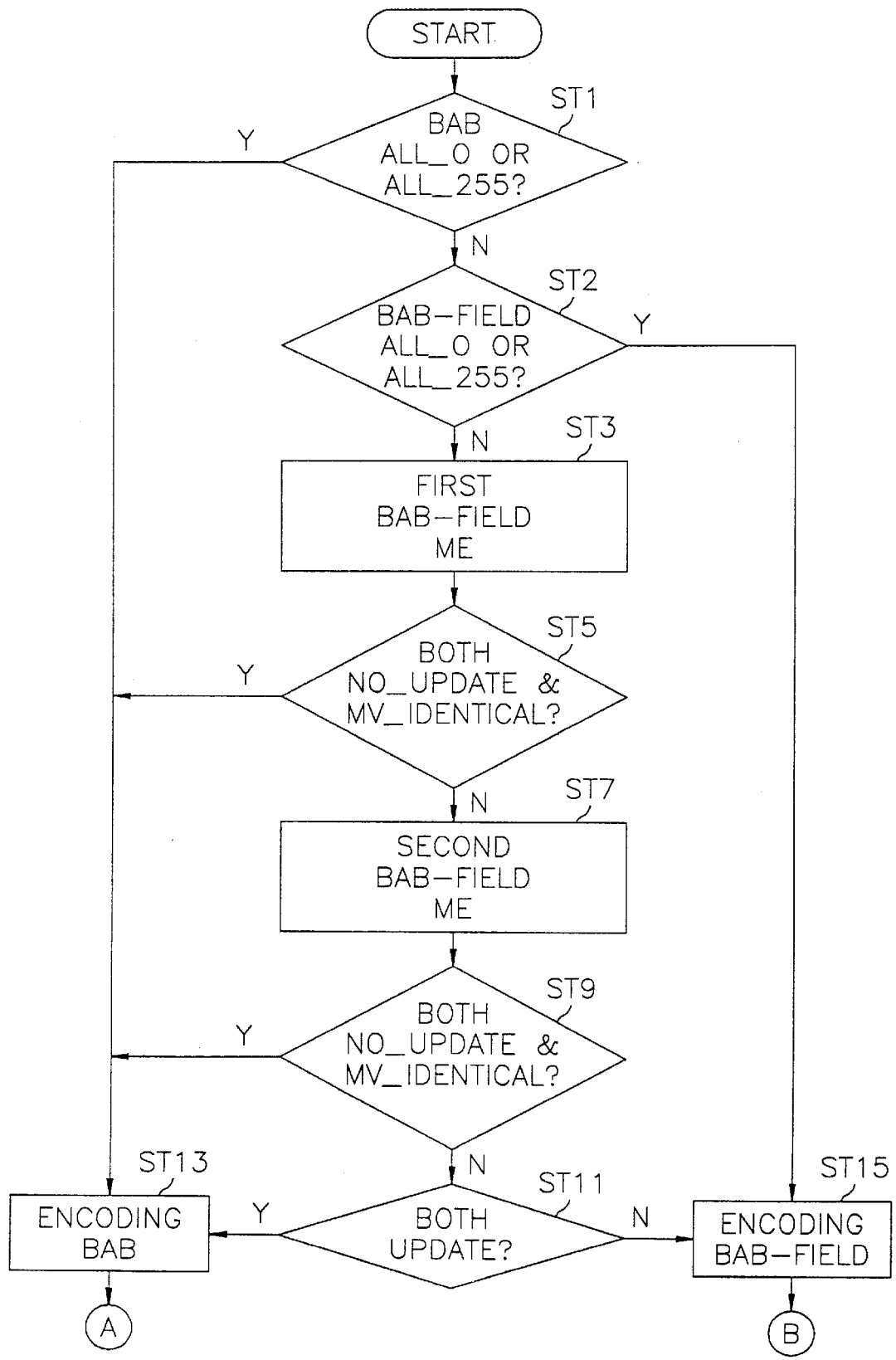
FIGS. 4A and 4B depict flow charts for use in describing a method for adaptive coding a binary shape signal in accordance with the preferred embodiment of the present invention.
Figure 4B:
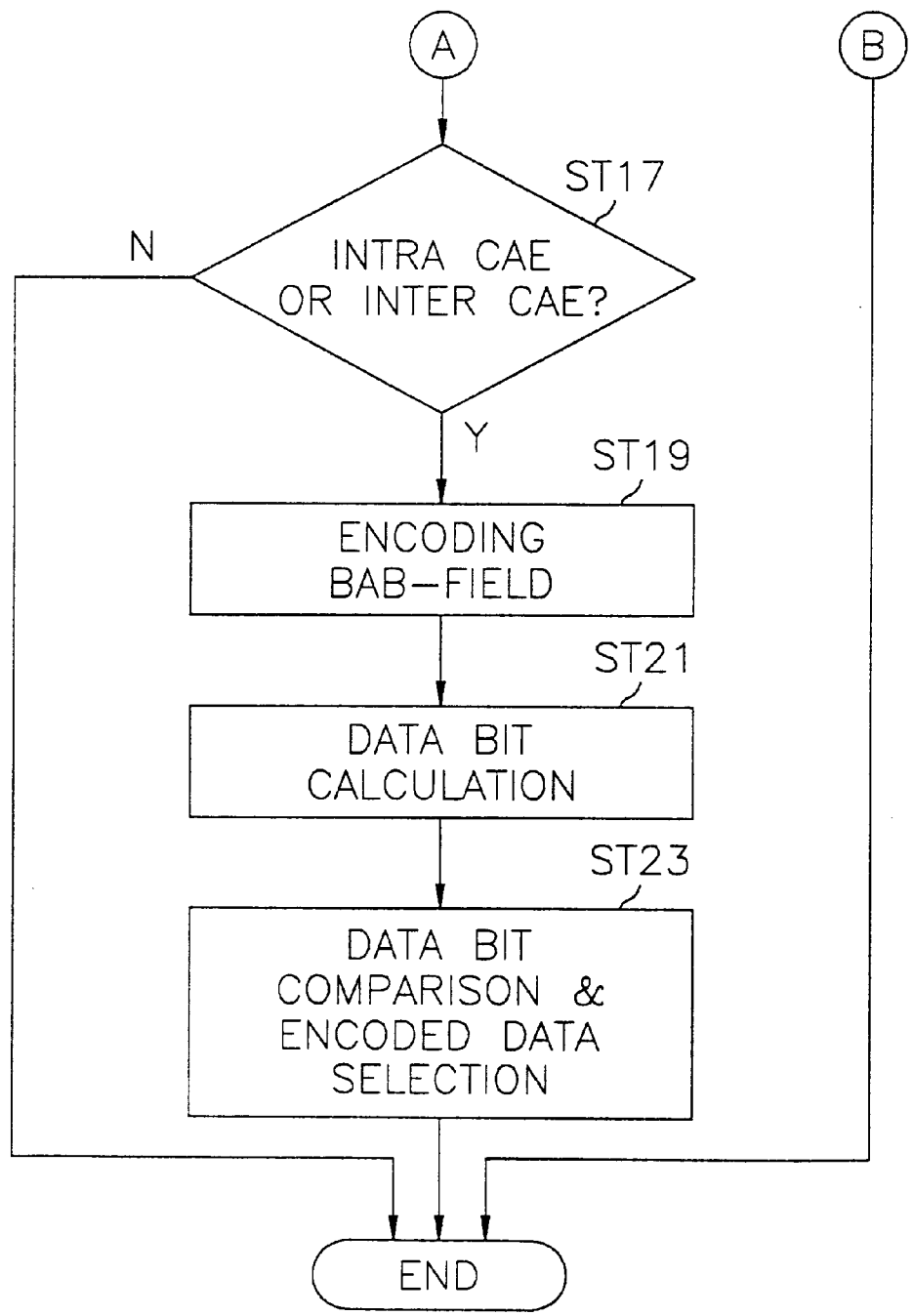

Referring to FIGS. 4A and 4B, there are depicted flow charts for use in describing a method for adaptive coding a binary shape signal in accordance with the preferred embodiment of the present invention. From now on, referring to FIGS. 4A and 4B, a method or a process for adaptive coding a binary signal in accordance with the present invention will be briefly described by using the terms has been defined in the description of the apparatus 100.

In accordance with the present invention, there is provided a method for adaptive coding a BAB of M×N binary pixels within a current frame based on the current frame and a previous frame, M and N being positive integers, respectively, wherein each of the current and the previous frames includes a plurality of BAB's, each frame has a top field and a bottom field, each BAB has a top BAB-field and a bottom BAB-field and each binary pixel has a binary value representing either an object pixel or a background pixel.

First, in an inter mode, at step ST1, if a BAB within the current frame is characterized as either All_0 or All_255, the process proceeds to step ST13. But, at step ST1, if the BAB is characterized as neither All_0 nor All_255, the top BAB-field and the bottom BAB-field of the BAB are generated. And then, the process flows to step ST2.

At step ST2, if either the top BAB-field or the bottom BAB-field is characterized as either All_0 or All_255, the process proceeds to step ST15. But, at step ST2, if none of the top BAB-field and the bottom BAB-field is characterized as either All_0 or All_255, the process flows to step ST3.

At step ST3, a first BAB-field ME including a first top BAB-field ME and a first bottom BAB-field ME is performed. In the first BAB-field ME, if the top BAB-field is characterized as NO_UPDATE, a first top BAB-field MV is generated. And in the first bottom BAB-field ME, if the bottom BAB-field is characterized as NO_UPDATE, a first bottom BAB-field MV is generated. Then the process goes to step ST5.

At step ST5, in case that the top BAB-field is characterized as NO_UPDATE together with as MV_IDENTICAL, a first MV is generated and at the same time a mode signal FR-N1 is generated. And then the process proceeds to step ST13. But, at step ST5, if a first MV is not generated, the process goes to step ST7.

At step ST7, a second BAB-field ME including a second top BAB-field ME and a second bottom BAB-field ME is performed. In the second top BAB-field ME, if the top BAB-field is characterized as NO_UPDATE, a second top BAB-field MV is generated. And in the second bottom BAB-field ME, if the bottom BAB-field is characterized as NO_UPDATE, a second bottom BAB-field MV is produced. Thereafter, the process goes to step ST9.

At step ST9, in case that the top BAB-field is characterized as NO_UPDATE together with as MV_IDENTICAL, a second MV is generated and at the same time a mode signal FR-N2 is generated. And then the process proceeds to step ST13. But, at step ST9, if a second MV is not generated, the process flows to step ST11.

At step ST11, it is checked that whether there exists a first and a second top BAB-field MV's and a first and a second bottom BAB-field MV's and then it is decided to encode the top BAB-field and the bottom BAB-field by using the BAB-frame coding method if none of a first and a second top BAB-field MV's and a first and a second bottom BAB-field MV's exists, i.e., both of the top BAB-field and the bottom BAB-field are characterized as UPDATE. In this case, the top BAB-field is combined with the bottom BAB-field to thereby provide the BAB and then the process goes to step ST13.

But, at step ST11, it is decided to encode the top BAB-field and the bottom BAB-field by using the BAB-field coding method to thereby provide the top BAB-field and the bottom BAB-field of the BAB within the current frame if at least one of the first and the second top BAB-field MV's and the first and the second bottom BAB-field MV's exist, i.e., at least one of the top BAB-field and the bottom BAB-field is characterized as NO_UPDATE. Then, the process flows to step ST15.

At step ST15, BAB-field coding on the top BAB-field and the bottom BAB-field is performed. Then the process is ended. Here, the detailed description for the BAB-field coding is omitted since it has been fully described in the description for the BAB-field coding circuit 170 in the apparatus 100.

Meanwhile, at step ST13, BAB-frame coding on the BAB is performed. Then the process proceeds to step ST17 through a tap A. Here, the detailed description for the BAB-field coding is also omitted since it has been fully described in the description for the BAB-frame coding circuit 180 in the apparatus 100.

At step ST17, if the BAB is characterized as either INTRA CAE or INTER CAE, the process proceeds to step ST19 and if otherwise, the process is ended.

At step ST19, the BAB is divided into a top BAB-field and a bottom BAB field and then the top BAB-field and the bottom BAB field are encoded by using BAB-field coding method in a same manner as that performed at step ST15 to thereby produce an encoded top BAB-field and an encoded bottom BAB-field, respectively. Then the process flows to step ST21.

At step ST21, first, a formatted encoded BAB is produced by combining the encoded top BAB-field with the encoded bottom BAB-field. And then, first data bit and second data bit for the encoded BAB and the formatted encoded BAB are calculated to thereby generate a first number of data bit and a second number of data bit, respectively. Thereafter, the process goes to step ST23.

At step ST23, the first number of data bit is compared with the second number of data bit. The encoded BAB is selected as a selected encoded BAB if the first number of data bit is less than the second number of data bit, and if otherwise, the formatted encoded BAB is selected as a selected encoded BAB. Then the process is ended.

As described above, in the apparatus and the method for adaptive coding a binary shape signal in accordance with the present invention, a BAB within a frame (or a VOP) is coded by using BAB-by-BAB basis coding (progressive coding) technique if the correlation between BAB's is higher than the correlation between BAB-field's and if otherwise, the BAB is coded by using BAB-field by BAB-field basis coding (interlaced coding) technique to thereby enhance the coding efficiency thereof.

While the present invention has been described with respect to certain preferred embodiments only, other modifications and variations may be made without departing from the spirit and scope of the present invention as set forth in the following claims.

What is claimed is:

1. An apparatus for adaptive coding a binary alpha block (BAB) of MxN binary pixels within a current frame based on the current frame and a previous frame, M and N being positive integers, respectively, wherein each of the current and the previous frames includes a plurality of BAB's, each frame has a top field and a bottom field, each BAB has a top BAB-field and a bottom BAB-field and each binary pixel has a binary value representing either an object pixel or a background pixel, comprising:

means for deciding to encode a BAB within the current frame on a BAB-by-BAB basis under a first condition that all of the binary pixels within the BAB are defined either as background pixels or as object pixels and deciding to encode the BAB on a BAB-field by BAB-field basis under a second condition that all of the binary pixels within one of the top BAB-field and the bottom BAB-field are defined either as background pixels or as object pixels when the first condition is not satisfied and providing the top BAB-field and the bottom BAB-field under a third condition that neither the first condition nor the second condition is satisfied;

means for transmitting the top BAB-field and then if a top BAB-field identical to the top BAB-field of the BAB is detected among top BAB-field's in a previous top field as a first predicted top BAB-field, providing a first top BAB-field motion vector (MV) representing a displacement between the first predicted top BAB-field and the top BAB-field; and means for transmitting the bottom BAB-field and then if a bottom BAB-field identical to the bottom BAB-field of the BAB is detected among bottom BAB-field's in a previous bottom field as a first predicted bottom BAB-field, providing a first bottom BAB-field MV representing a displacement between the first predicted bottom BAB-field and the bottom BAB-field.

2. The apparatus according to claim 1, further comprising:

means, if there exists a first predicted top BAB-field MV which is identical to a first bottom BAB-field MV, for providing the first predicted top BAB-field MV which is identical to the first bottom BAB-field MV as a first MV and at the same time generating a mode signal FR-N1 informing that the first MV exists and if the first MV does not exist, providing the top BAB-field and the bottom BAB-field of the BAB.

3. The apparatus according to claim 2, further comprising:

means, if a bottom BAB-field identical to the top BAB-field of the BAB is detected among the bottom BAB-field's in the previous bottom field as a second predicted top BAB-field, for providing a second top BAB-field MV representing a displacement between the second predicted top BAB-field and the top BAB-field of the BAB; and means, if a top BAB-field identical to the bottom BAB-field of the BAB is detected among the top BAB-field's in the previous top field as a second predicted bottom BAB-field, for providing a second bottom BAB-field MV representing a displacement between the second predicted bottom BAB-field and the bottom BAB-field of the BAB.

4. The apparatus according to claim 3, further comprising:

means for deciding to encode the top BAB-field and the bottom BAB-field on a BAB-by-BAB basis if there exists a second top BAB-field MV which is identical to a second bottom BAB-field MV, thereby providing the second top BAB-field MV which is identical to the second bottom BAB-field MV as a second MV and generating a mode signal FR-N2 informing that the second MV exists; if a second MV does not exist, checking whether there exist a first and a second top BAB-field MV's and a first and a second bottom BAB-field MV's; and then deciding to encode the BAB on a BAB-by-BAB basis, if none of the first and the second top BAB-field MV's and the first and the second bottom BAB-field MV's exists, to thereby combine the top BAB-field with the bottom BAB-field to provide the BAB; deciding, if at least one of the first and the second top BAB-field MV's and the first and the second bottom BAB-field MV's exists when there is no second MV, to encode the BAB on a BAB-field by BAB-field basis to thereby provide the top BAB-field field and the bottom BAB-field of the BAB within the current frame; providing, if either the first and the second top BAB-field MV's exist or only the first top BAB-field MV of the first and the second top BAB-field MV's exists, the first top BAB-field MV together with a control signal CT1; providing, if only the second top BAB-field MV of the first and the second top BAB-field MV's exists, the second top BAB-field MV together with a control signal CT2; providing, if either the first and the second bottom BAB-field MV's exist or only the first bottom BAB-field MV of the first and the second bottom BAB-field MV's exists, the first bottom BAB-field MV together with a control signal CB1; and providing, if only the second bottom BAB-field MV of the first and the second bottom BAB-field MV's exists, the second bottom BAB-field MV together with a control signal CB2.

5. The apparatus according to claim 4, wherein said means for deciding to encode the BAB within the current frame on a BAB-by-BAB basis under the first condition generates a mode signal FR-3 if all of the binary pixels within the BAB are defined as background pixels and a mode signal FR-4 if all of the binary pixels within the BAB are defined as object pixels, and under the second condition, generates a mode signal T-3 if all of the binary pixels within the top BAB-field are defined as background pixels and a mode signal T-4 if all of the binary pixels within the top BAB-field are defined as object pixels and generates a mode signal B-3 if all of the binary pixels within the bottom BAB-field are defined as background pixels and a mode signal B-4 if all of the binary pixels within the bottom BAB-field are defined as object pixels.

6. The apparatus according to claim 5, further comprising:

means for encoding the mode signals T-3 and T-4 to thereby provide encoded mode signals [T-3] and [T-4] as encoded top BAB-field's, respectively, and encoding mode signals B-3 and B-4 to thereby provide encoded mode signals [B-3] and [B-4] as encoded bottom BAB-field's, respectively; encoding, in response to either the control signal CT1 or the control signal CT2, the top BAB-field to thereby generate an encoded top BAB-field and encoding, in response to either the control signal CB1 or the control signal CB2, the bottom BAB-field to thereby generate an encoded bottom BAB-field; encoding, if neither the mode signal T-3 nor the mode signal T-4 is generated when neither the control signal CT1 nor the control signal CT2 is generated, the binary pixel data of the top BAB-field by using a predetermined one of an intra context based arithmetic encoding (CAE) method and an inter CAE method to thereby generate encoded top BAB-field binary pixel data and an encoded mode signal to the top BAB-field and then combining the encoded top BAB-field binary pixel data with the encoded mode signal corresponding thereto to thereby produce an encoded top BAB-field; and encoding, if neither the mode signal B-3 nor the mode signal B-4 is generated when neither the control CB1 nor the control signal CB2 is generated, the binary pixel data of the bottom BAB-field by using the predetermined one of the intra CAE method and the inter CAE method to thereby generate encoded bottom BAB-field binary pixel data and an encoded mode signal to the bottom BAB-field and then combining the encoded bottom BAB-field binary pixel data with the encoded mode signal corresponding thereto to thereby produce an encoded bottom BAB-field.

7. The apparatus according to claim 6, wherein said means for encoding the mode signals T-3 and T-4 performs checking, in response to the control signal CT1, by using a conventional checking method based on a predetermined motion vector predictor for shape (MVPs) for the top BAB-field and the first top BAB-field MV inputted thereto whether a motion vector difference for shape (MVDs) for the top BAB-field is 0 or not and then generating a mode signal TT-1 if the MVDs is 0 and a mode signal TT-2 if the MVDs is not 0; thereafter encoding the mode signal TT-1 to thereby provide an encoded mode signal [TT-1] as the encoded top BAB-field and encoding the MVDs for the top BAB-field and the mode signal TT-2 to generate an encoded MVDs for the top BAB-field and an encoded mode signal [TT-2], respectively, and then combining the encoded MVDs with the encoded mode signal [TT-2] to thereby provide the encoded top BAB-field; and checking, in response to the control signal CT2, by using the conventional checking method based on the predetermined MVPs for the top BAB-field and the second top BAB-field MV inputted thereto whether the MVDs for the top BAB-field is 0 or not and then generating a mode signal BT-1 if the MVDs is 0 and a mode signal BT-2 if the MVDs is not 0 and then encoding the mode signal BT-1 to thereby provide an encoded mode signal [BT-1] as the encoded top BAB-field and encoding the MVDs for the top BAB-field and the mode signal BT-2 to generate an encoded MVDs for the top BAB-field and an encoded mode signal [BT-2], respectively, and then combining the encoded MVDs with the encoded mode signal [BT-2] to thereby provide the encoded top BAB-field.

8. The apparatus according to claim 7, wherein said means for encoding the mode signals T-3 and T-4 performs further checking, in response to the control signal CB1, by using the conventional checking method based on a predetermined MVPs for the bottom BAB-field and the first bottom BAB-field MV inputted thereto whether the MVDs for the bottom BAB-field is 0 or not and then generating a mode signal BB-1 if the MVDs is 0 and a mode signal BB-2 if the MVDs is not 0; encoding the mode signal BB-1 to thereby provide an encoded mode signal [BB-1] as the encoded bottom BAB-field and encoding the MVDs for the bottom BAB-field and the mode signal BB-2 to generate an encoded MVDs for the bottom BAB-field and an encoded mode signal [BB-2], respectively, and then combining the encoded MVDs with the encoded mode signal [BB-2] to thereby provide the encoded bottom BAB-field; and checking, in response to the control signal CB2, by using the conventional checking method based on the predetermined MVPs for the bottom BAB-field and the second bottom BAB-field MV inputted thereto whether the MVDs for the bottom BAB-field is 0 or not and then generating a mode signal TB-1 if the MVDs is 0 and a mode signal TB-2 if the MVDs is not 0; thereafter encoding the mode signal TB-1 to thereby provide an encoded mode signal [TB-1] as the encoded bottom BAB-field and encoding the MVDs for the bottom BAB-field and the mode signal TB-2 to generate an encoded MVDs for the bottom BAB-field and an encoded mode signal [TB-2], respectively, and then combining the encoded MVDs with the encoded mode signal [TB-2] to thereby provide the encoded bottom BAB-field.

9. The apparatus according to claim 8, further comprising:
means for encoding the mode signals FR-3 and FR-4 to thereby generate encoded mode signals [FR-3] and [FR-4], respectively; if either the mode signal FR-N1 or the mode signal FR-N2 is inputted thereto, checking whether the MVDs corresponding thereto is 0 or not to thereby provide an encoded BAB based on the result of the checking; and if none of the mode signal FR-3 and FR-4 is generated and at the same time none of the mode signals FR-N1 and FR-N2 is inputted thereto, encoding the binary pixel data of the BAB inputted thereto by using the predetermined one of the inter CAE method and the intra CAE method to generate encoded binary pixel data of the BAB and at the same time generating a mode signal to the BAB and then encoding the mode signal corresponding thereto to generate an encoded mode signal corresponding thereto, thereafter combining the encoded binary pixel data of the BAB with the mode signal corresponding thereto to thereby provide an encoded BAB and dividing the BAB into the top BAB-field and the bottom BAB-field and then providing the top BAB-field and the bottom BAB-field.

10. The apparatus according to claim 9, wherein said means for encoding the mode signals FR-3 and FR-4 checks, if the mode signal FR-N1 is inputted thereto, whether the MVDs corresponding thereto is 0 or not based on a predetermined MVPs corresponding thereto and the first MV inputted thereto and then generates a mode signal FR-1 if the MVDs corresponding thereto is 0 and a mode signal FR-2 if the MVDs is not 0 and then encodes the mode signal FR-1 to provide an encoded mode signal [FR-1] as an encoded BAB and thereafter encodes the MVDs corresponding thereto and the mode signal FR-2 to generate an encoded MVDs and an encoded mode signal [FR-2], respectively, and then combines the encoded MVDs with the encoded mode signal [FR-2] to thereby provide an encoded BAB; and checks, if the mode signal FR-N2 is inputted thereto, whether the MVDs corresponding thereto is 0 or not based on a predetermined MVPs corresponding thereto and the second MV inputted thereto and then generates a mode signal FR-1' if the MVDs corresponding thereto is 0 and a mode signal FR-2' if the MVDs is not 0 and then encodes the mode signal FR-1' to provide an encoded mode signal [FR-1'] as an encoded BAB and thereafter encodes the MVDs corresponding thereto and the mode signal FR-2' to generate an encoded MVDs and an encoded mode signal [FR-2], respectively, and then combines the encoded MVDs with the encoded mode signal [FR-2] to thereby provide the encoded BAB.

11. The apparatus according to claim 10, the apparatus further comprising:
means for encoding the binary pixel data of the top BAB-field by using the predetermined one of the intra CAE method and the inter CAE method to thereby generate encoded top BAB-field binary pixel data and an encoded mode signal to the top BAB-field and then combining the encoded top BAB-field binary pixel data with the encoded mode signal corresponding thereto to thereby produce an encoded top BAB-field and encoding the binary pixel data of the bottom BAB-field by using the predetermined one of the intra CAE method and the inter CAE method to thereby generate encoded bottom BAB-field binary pixel data and an encoded mode signal to the bottom BAB-field and then combining the encoded bottom BAB-field binary pixel data with the encoded mode signal corresponding thereto to thereby produce an encoded bottom BAB-field and then, generating a formatted encoded BAB obtained by combining the encoded top BAB-field and the encoded bottom BAB-field;

means for calculating first data bit and second data bit for the encoded BAB and the formatted encoded BAB to thereby generate a first number of data bit and a second number of data bit, respectively;

means for comparing the first number of data bit with the second number of data bit and then providing a first selection signal if the first number of data bit is less than the second number of data bit and providing a second selection signal if otherwise; and means for selecting the encoded BAB and the encoded formatted BAB as selected encoded BAB's in response to the first selection signal and the second selection signal, respectively.

12. The apparatus according to claim 11, wherein the current and the previous frames are replaced by a current video object plane (VOP) and a previous VOP, respectively.

13. A method for adaptive coding a binary alpha block (BAB) of M×N binary pixels within a current frame based on the current frame and a previous frame including a plurality of BAB's, M and N being positive integers, respectively, wherein each of the current and the previous frames includes a plurality of BAB's, each frame has a top field and a bottom field, each BAB has a top BAB-field and a bottom BAB-field and each binary pixel has a binary value representing either an object pixel or a background pixel, comprising the steps of:

(a) deciding to encode a BAB within the current frame on a BAB-by-BAB basis under a first condition that all of the binary pixels within the BAB are defined either as background pixels or as object pixels and deciding to encode the BAB on a BAB-field by BAB-field basis under a second condition that all of the binary pixels within one of the top BAB-field and the bottom BAB-field are defined either as background pixels or as object pixels and at the same time the binary pixels within the BAB are defined neither as background pixels nor as object pixels and providing the top BAB-field and the bottom BAB-field under a third condition that neither the first condition nor the second condition is satisfied;

(b) transmitting the top BAB-field and then if a top BAB-field defined as identical to the top BAB-field of the BAB is detected among the top BAB-field's in a previous top field as a first predicted top BAB-field, generating a first top BAB-field motion vector (MV) representing the displacement between the first predicted top BAB-field and the top BAB-field; and (c) transmitting the bottom BAB-field and then if a bottom BAB-field defined as identical to the bottom BAB-field of the BAB is detected among the bottom BAB-field's in a previous bottom field as a first predicted bottom BAB-field, generating a first bottom BAB-field MV representing the displacement between the first predicted bottom BAB-field and the bottom BAB-field.

14. The method according to claim 13, further comprising the steps of:

(d) deciding to encode the BAB on a BAB-by-BAB basis if there exists a first predicted top BAB-field MV which is identical to a first bottom BAB-field MV, thereby providing the first predicted top BAB-field MV which is identical to the first bottom BAB-field MV as a first MV and at the same time generating a mode signal FR-N1 informing that the first MV exists and if there does not exist a first MV, providing the top BAB-field and the bottom BAB-field of the BAB.

15. The method according to claim 14, further comprising the steps of:

(e) providing, if a bottom BAB-field defined as identical to the top BAB-field of the BAB is detected among the bottom BAB-fields in the previous bottom field as a second predicted top BAB-field, a second top BAB-field MV representing the displacement between the second predicted top BAB-field and the top BAB-field of the BAB; and (f) providing, if a top BAB-field defined as identical to the bottom BAB-field of the BAB is detected among the top BAB-field's in the previous top field as a second predicted bottom BAB-field, a second bottom BAB-field MV representing the displacement between the second predicted bottom BAB-field and the bottom BAB-field of the BAB.

16. The method according to claim 15, further comprising the step of (g) deciding the coding method of the BAB, where said deciding step (g) includes the steps of:

(g1) deciding to encode the top BAB-field and the bottom BAB-field on a BAB-by-BAB basis if there exists a second top BAB-field MV which is identical to a second bottom BAB-field MV, thereby providing the second top BAB-field MV which is identical to the second bottom BAB-field MV as a second MV and generating a mode signal FR-N2 informing that the second MV exists;

(g2) checking, if a second MV is not provided at the step (g1), whether there exist a first and a second top BAB-field MV's and a first and a second bottom BAB-field MV's;

(g3) deciding to encode the BAB on a BAB-by-BAB basis if there exists neither a first predicted top BAB-field MV nor a second top BAB-field MV and at the same time there exists neither a first bottom BAB-field MV nor a second bottom BAB-field MV to thereby combine the top BAB-field with the bottom BAB-field to provide the BAB;

(g4) deciding, if at least one among the first and the second top BAB-field MV's and the first and the second bottom BAB-field MV's exists under the condition that there is no second MV, to encode the BAB on a BAB-field by BAB-field basis to thereby provide the top BAB-field and the bottom BAB-field;

(g5) providing, if either the first and the second top BAB-field MV's exist or only the first top BAB-field MV of the first and the second top BAB-field MV's exists, the first top BAB-field MV and generating a control signal CT1;

(g6) providing, if only the second top BAB-field MV of the first and the second top BAB-field MV's exists, the second top BAB-field MV and generating a control signal CT2;

(g7) providing, if either the first and the second bottom BAB-field MV's exist or only the first bottom BAB-field MV of the first and the second bottom BAB-field MV's exists, the first bottom BAB-field MV and generating a control signal CB1; and (g8) providing, if only the second bottom BAB-field MV of the first and the second bottom BAB-field MV's exists, the second bottom BAB-field MV and generating a control signal CB2.

17. The method according to claim 16, wherein in the step (a), a mode signal FR-3 is generated if all of the binary pixels within the BAB are defined as background pixels and a mode signal FR-4 is generated if all of the binary pixels within the BAB are defined as object pixels, and under the second condition, a mode signal T-3 is generated if all of the binary pixels within the top BAB-field are defined as background pixels and a mode signal T-4 is generated if all of the binary pixels within the top BAB-field are defined as object pixels and a mode signal B-3 is generated if all of the binary pixels within the bottom BAB-field are defined as background pixels and a mode signal B-4 is generated if all of the binary pixels within the bottom BAB-field are defined as object pixels.

18. The method according to claim 17, further comprising the step of (h) BAB-field coding to encode the top BAB-field and the bottom BAB-field of the BAB, where said BAB-field coding step (h) includes the steps of:

(h1) encoding the mode signals T-3 and T-4 to thereby provide encoded mode signals [T-3] and [T-4] as encoded top BAB-field's, respectively and encoding the mode signals B-3 and B-4 to thereby provide encoded mode signals [B-3] and [B-4] as encoded bottom BAB-field's, respectively;

(h2) checking, when the control signal CT1 is generated at the step (g5), by using a conventional checking method based on a predetermined motion vector predictor for shape (MVPs) for the top BAB-field and the first top BAB-field MV whether the motion vector difference for shape (MVDs) for the top BAB-field is 0 or not and then generating a mode signal TT-1 and a mode signal TT-2 if the MVDs is 0 and not 0, respectively;

(h3) encoding the mode signal TT-1 to thereby provide an encoded mode signal [TT-1] as an encoded top BAB-field and encoding the MVDs for the top BAB-field and the mode signal TT-2 to generate an encoded MVDs for the top BAB-field and an encoded mode signal [TT-2], respectively, and then combining the encoded MVDs with the encoded mode signal [TT-2] to thereby provide an encoded top BAB-field;

(h4) checking, when the control signal CT2 is generated at the step (g6), by using the conventional checking method based on the predetermined MVPs for the top BAB-field and the second top BAB-field MV whether the MVDs for the top BAB-field is 0 or not and then generating a mode signal BT-1 and a mode signal BT-2 if the MVDs is 0 and not 0, respectively;

(h5) encoding the mode signal BT-1 to thereby provide an encoded mode signal [BT-1] as an encoded top BAB-field and encoding the MVDs for the top BAB-field and the mode signal BT-2 to generate an encoded MVDs for the top BAB-field and an encoded mode signal [BT-2], respectively, and then combining the encoded MVDs with the encoded mode signal [BT-2] to thereby provide an encoded top BAB-field;

(h6) checking, when the control signal CB1 is generated at the step (g7), by using the conventional checking method based on a predetermined MVPs for the bottom BAB-field and the first bottom BAB-field MV whether the MVDs for the top BAB-field is 0 or not and then generating a mode signal BB-1 and a mode signal BB-2 if the MVDs is 0 and not 0, respectively;

(h7) encoding the mode signal BB-1 to thereby provide an encoded mode signal [BB-1] as an encoded bottom BAB-field and encoding the MVDs for the bottom BAB-field and the mode signal BB-2 to generate an encoded MVDs for the bottom BAB-field and an encoded mode signal [BB-2], respectively, and then combining the encoded MVDs with the encoded mode signal [BB-2] to thereby provide an encoded bottom BAB-field;

(h8) checking, when the control signal CB2 is generated at the step (g8), by using the conventional checking method based on the predetermined MVPs for the bottom BAB-field and the second bottom BAB-field MV whether the MVDs for the bottom BAB-field is 0 or not and then generating a mode signal TB-1 and a mode signal TB-2 if the MVDs is 0 and not 0, respectively;

(h9) encoding the mode signal TB-1 to thereby provide an encoded mode signal [TB-1] as an encoded bottom BAB-field and encoding the MVDs for the bottom BAB-field and the mode signal TB-2 to generate an encoded MVDs for the bottom BAB-field and an encoded mode signal [TB-2], respectively, and then combining the encoded MVDs with the encoded mode signal [TB-2] to thereby provide an encoded bottom BAB-field;

(h10) encoding, if neither the mode signal T-3 nor the mode signal T-4 is generated at the step (a) and at the same time neither the control signal CT1 nor the control signal CT2 is generated, the binary pixel data of the top BAB-field by using a predetermined one of an intra context based arithmetic encoding (CAE) method and an inter CAE method to thereby generate an encoded top BAB-field binary pixel data and an encoded mode signal to the top BAB-field and then combining the encoded top BAB-field binary pixel data with the encoded mode signal corresponding thereto to thereby provide an encoded top BAB-field; and (h11) encoding, if neither the mode signal B-3 nor the mode signal B-4 is generated at the step (a) and at the same time neither the control CB1 nor the control signal CB2 is generated, the binary pixel data of the bottom BAB-field by using the predetermined one of the intra CAE method and the inter CAE method to thereby generate an encoded bottom BAB-field binary pixel data and an encoded mode signal to the bottom BAB-field and then combining the encoded bottom BAB-field binary pixel data with the encoded mode signal corresponding thereto to thereby produce an encoded bottom BAB-field.

19. The method according to claim 18, further comprising the step of (i) BAB-frame coding to encode the BAB, wherein said BAB-frame coding step (i) includes the steps of:

(i1) encoding the mode signals FR-3 and FR-4 to thereby generate encoded mode signals [FR-3] and [FR-4], respectively;

(i2) checking, if the mode signal FR-N1 is generated at the step (d), whether the MVDs corresponding thereto is 0 or not based on a predetermined MVPs corresponding thereto and the first MV and then generating a mode signal FR-1 and a mode signal FR-2 if the MVDs is 0 and not 0, respectively, thereafter encoding the mode signal FR-1 to provide an encoded mode signal [FR-1] as an encoded BAB and then encoding the MVDs corresponding thereto and the mode signal FR-2 to generate an encoded MVDs and an encoded mode signal [FR-2], respectively, and then combining the encoded MVDs with the encoded mode signal [FR-2] to thereby provide an encoded BAB;

(i3) checking, if the mode signal FR-N2 is generated at the step (g1), whether the MVDs corresponding thereto is 0 or not based on a predetermined MVPs corresponding thereto and the second MV and then generating a mode signal FR-1' and a mode signal FR-2' if the MVDs is 0 and not 0, respectively, thereafter encoding the mode signal FR-1' to provide an encoded mode signal [FR-1'] as an encoded BAB and then encoding the MVDs corresponding thereto and the mode signal FR-2' to generate an encoded MVDs and an encoded mode signal [FR-2'], respectively, and then combining the encoded MVDs with the encoded mode signal [FR-2'] to thereby provide an encoded BAB; and (i4) encoding, if none of the mode signals FR-3, FR-4, FR-1, FR-2, FR-1' and FR-2 is generated, the binary pixel data of the BAB by using the predetermined one of the inter CAE method and the intra CAE method to thereby generate an encoded binary pixel data of the BAB and at the same time generating a mode signal corresponding to the BAB and then encoding the mode signal corresponding thereto to generate an encoded mode signal corresponding thereto, thereafter combining the encoded binary pixel data of the BAB with the mode signal corresponding to the BAB to provide an encoded BAB and at the same time dividing the BAB into the top BAB-field and the bottom BAB-field and then providing the top BAB-field and the bottom BAB-field.

20. The method according to claim 19, further comprising the step of (j) deciding to select one of the encoded BAB and a formatted encoded BAB obtained by combining the encoded top BAB-field of the BAB with the encoded bottom BAB-field of the BAB, wherein said deciding step (j) includes the steps of:

(j1) encoding the binary pixel data of the top BAB-field by using the predetermined one of the intra CAE method and the inter CAE method to thereby generate an encoded top BAB-field binary pixel data and an encoded mode signal to the top BAB-field and then combining the encoded top BAB-field binary pixel data with the encoded mode signal corresponding thereto to thereby produce an encoded top BAB-field and encoding the binary pixel data of the bottom BAB-field by using the predetermined one of the intra CAE method and the inter CAE method to thereby generate an encoded bottom BAB-field binary pixel data and an encoded mode signal to the bottom BAB-field and then combining the encoded bottom BAB-field binary pixel data with the encoded mode signal corresponding thereto to thereby produce an encoded bottom BAB-field and then, generating a formatted encoded BAB obtained by combining the encoded top BAB-field of the BAB and the encoded bottom BAB-field of the BAB;

(j2) calculating first data bit and second data bit for the encoded BAB and the formatted encoded BAB to thereby generate a first number of data bit and a second number of data bit, respectively;

(j3) comparing the first number of data bit with the second number of data bit and then generating a first selection signal if the first number of data bit is less than the second number of data bit and generating a second selection signal if the first number of data bit is not less than the second number of data bit; and (j4) selecting the encoded BAB and the encoded formatted BAB as selected encoded BAB's when the first and the second selection signals are generated at the step (j3), respectively.

* * * * *